Jan. 16, 1934.  H. M. CORSE  1,944,068
FUEL CONTROL SYSTEM
Filed May 4, 1932  5 Sheets-Sheet 1

Inventor
*H. M. Corse*

By *Geo. P. Kimmel*
Attorney

Jan. 16, 1934.　　　H. M. CORSE　　　1,944,068
FUEL CONTROL SYSTEM
Filed May 4, 1932　　　5 Sheets-Sheet 4

Inventor
H. M. Corse
By Geo. P. Kimmel
Attorney

Jan. 16, 1934.  H. M. CORSE  1,944,068
FUEL CONTROL SYSTEM
Filed May 4, 1932  5 Sheets-Sheet 5

Inventor
H. M. Corse
By Geo. P. Kimmel
Attorney

Patented Jan. 16, 1934

1,944,068

UNITED STATES PATENT OFFICE 1,944,068

FUEL CONTROL SYSTEM

Herbert M. Corse, Jacksonville, Fla.

Application May 4, 1932. Serial No. 609,297

28 Claims. (Cl. 261—18)

My invention relates to a controlling system for delivering fuels to internal combustion engines.

The object of my invention is to provide, in internal combustion engines, means for delivering to the combustion chamber of the latter, fuels in such a manner as to permit of automatic and substantially infinite variations of the proportions in which the fuels are mixed, as the duty of the engine may demand, while at the same time providing means for varying said proportions at the will of the operator.

It has long been known in the art that internal combustion engines designed and constructed primarily to operate on low boiling liquid fuels, such as gasoline, may be made to operate under certain conditions on a mixture of low and higher boiling fuels, and under some conditions altogether on higher boiling fuels. However, the conditions under which automotive and other internal combustion engines operate, especially automobile, boat, aeroplane and tractor engines vary so frequently as to speed and load, and within such short intervals of time, that it has heretofore been impossible to utilize fuels in the practical operation of such engines.

For example: an automobile engine, when starting from the cold state must be supplied with substantially low boiling fuel, such as gasoline. When it is warm and running at moderate speed under moderate load, it may be operated on a proper mixture of gasoline and a higher boiling fuel or distillate. When running at high speed under load, it may in some cases be operated altogether on higher boiling fuel. If the speed is then lowered, there may be required an addition of lower boiling fuel. Where the engine must be started and stopped frequently or load varied frequently, as in the case of an automobile engine operated in congested traffic, a still greater proportion of lower boiling fuel or even pure gasoline may be desired, and the same is true when the engine is slowly idling.

Since the higher boiling liquid fuels, and especially the liquid petroleum fuels, are often much cheaper than the lower boiling liquid fuels, it will be readily understood that a substantial economy in the operation of such engines may be achieved by using as much of the high boiling liquid fuels as possible. However, as I have previously indicated, the proportions in which the lower and higher boiling liquid fuels are mixed and sent to the combustion chamber must be varied too frequently and too suddenly to make practicable the manual control of this variation at all times.

I have discovered that practically infinite variation of the proportion of liquid fuels used and usually automatic control of these proportions, properly coordinated with the needs of the engine is necessary to the solution of this problem, and my novel system is based upon this discovery of mine.

In the practice of my invention I may provide means for preheating the higher boiling fuel or fuels to facilitate the combustion thereof and in this way the cold engine may be started with lower boiling fuel and by the time it is desired to begin feeding in the higher boiling fuel, the latter will have become warm from the heat of the engine.

In order to avoid shifting too suddenly from the lower boiling fuel to a mixture of lower and higher boiling fuels, I have discovered that it is desirable to provide automatic means for retarding the inflow of higher boiling liquid after the throttle is operated. This allows for the sudden opening of the throttle and permits the engine to reach considerable speed before the higher boiling liquid begins to be fed in a large proportion.

In the practice of my invention, I sometimes prefer to provide means for adding to the carbureted mixture inert gases for the purpose of preventing what is commonly termed "knocking" in the engine. For this purpose I may employ exhaust gases from the engine and at the same time utilize the heat of this to warm the ingoing high boiling fuel.

In order to avoid shifting to higher boiling fuel at a low engine temperature, I have discovered that it is desirable to provide automatic means for retarding the inflow of higher boiling point liquids after the throttle is opened.

It will be readily understood that my novel system is not dependent upon any one mechanical arrangement or construction designed to serve as means for operating the system. My invention comprises any means which may provide for the control of the proportions in which the plurality of fuels is supplied to the combustion chamber of the engine; also means for doing this while at the same time permitting the variation of these proportions to be controlled by the operator; also means for doing this by manual control only. In order to more fully describe my novel system which is my invention, I shall give one or more illustrations of how it may be practiced, but it will be understood that my invention is in no way limited to or by the examples set forth but which falls within the scope of the invention as claimed.

In the drawings:

Figure 7 is a section on line 7—7 Figure 5.

I desire to point out that the difference between a liquid and a gaseous fuel is simply a question of the temperature and pressure under which the substance regarded as a fuel may be at the time it is considered. All fuels whose chemical composition is not materially altered by changes in temperature and pressure may be, at least theoretically, presented as solid, liquid or gas if the proper temperature and pressure is made to obtain. My novel system, therefore, comprises all phases in which a fuel may be used. Throughout this application, wherever the term "liquid fuel" is used, the gaseous or solid phase, under suitable conditions, is meant to be comprised in this term. My invention does not depend upon the chemical composition nor upon the phase of any fuel used. My invention is likewise to be understood to comprise any plurality of fuels. For the purposes of clear explanation, the discussion, examples and illustrations set forth in this specification deal with two liquid fuels, but as explained hereinabove, my novel system is not limited to such, but comprises fuels in any phase and any plurality. For the purposes of this application, the term "fuel" should be interpreted to mean in addition to the above, either one fuel or a plurality of fuels as such, or mixed with air, or inert gases, or any other mixture finally delivered in the combustion chamber, as the context may require.

Figure 1:
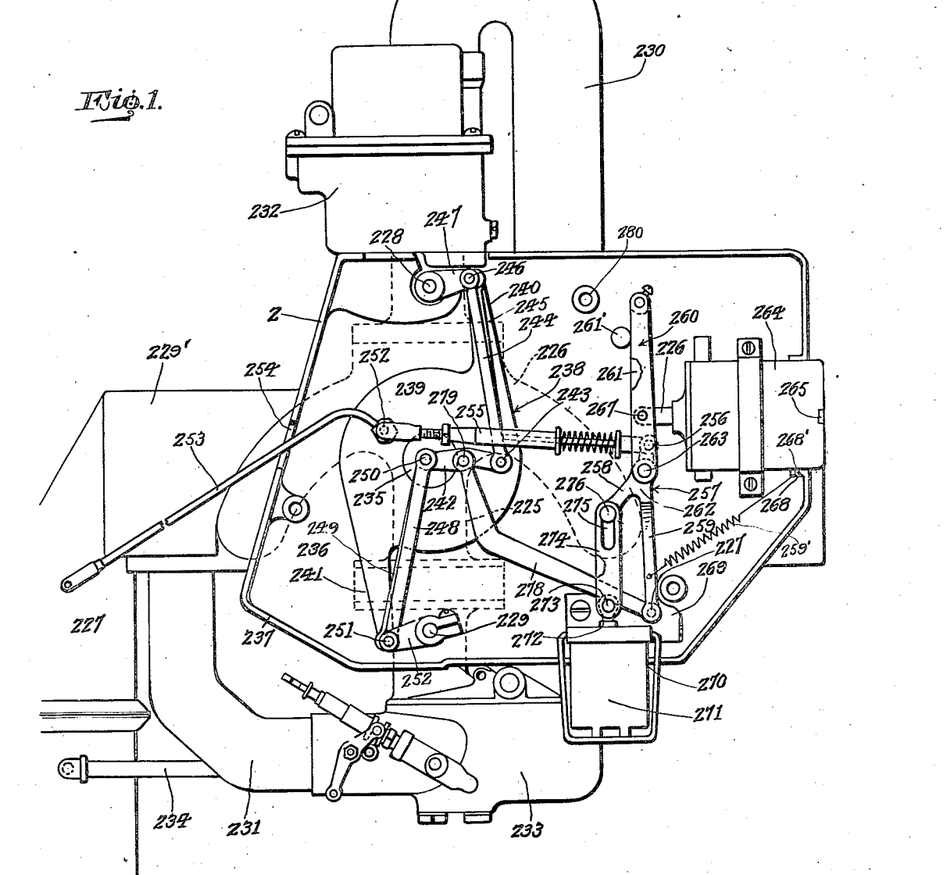
Figure 1 is a side elevation of an internal combustion engine showing the adaptation therewith of a combined automatic and manually operable fuel controlling means in accordance with my invention.

Referring to Figure 1 of the drawings, 225 indicates a tubular element opening, at a point intermediate its ends into the intake manifold 226 of an internal combustion engine having its discharge manifold designated 227. Arranged above and below the point of communication between element 225 and manifold 226 respectively is a controlling valve. The valves are not shown and are positioned within element 225, but the shafts of such upper and lower valves are designated 228 and 229 respectively. That part of the element 225 between the valves is termed a mixing chamber. The arrangement of the valves referred to is as shown in the modified form illustrated by Figures 2 and 4. A hot air heater 229' is positioned upon the discharge manifold 227. Leading from heater 229' and opening into the top of element 225 is a warm air conducting pipe 230 provided with a choke valve, not shown.

Leading from heater 229' is a warm air conducting pipe 231. Arranged near the top of element 225 and communicating therewith is a low boiling fluid supply means 232 of any suitable form. Arranged at the bottom of element 225 and communicating therewith is a higher boiling fluid supply means 233 of any suitable form. The pipe 231 communicates with the supply means 232 and 233. The supply means 233 is provided with choke valves not shown. Extending from manifold 227 and opening into the lower end of supply means 233 is an inert gas conducting pipe 234. The foregoing elements, with the exception of shafts 228, 229 have been referred to inferentially and not specifically, because it is the controlling means for the shafts 228, 229 as well as the casing for such means which will be specifically referred to. Figure 1 illustrates the arrangement of the fuel controlling means with respect to the shafts of the controlling valves, and therefore it is thought unnecessary to specifically describe and illustrate elements 225 to 227 and 230 to 234.

Figures 4, 9:
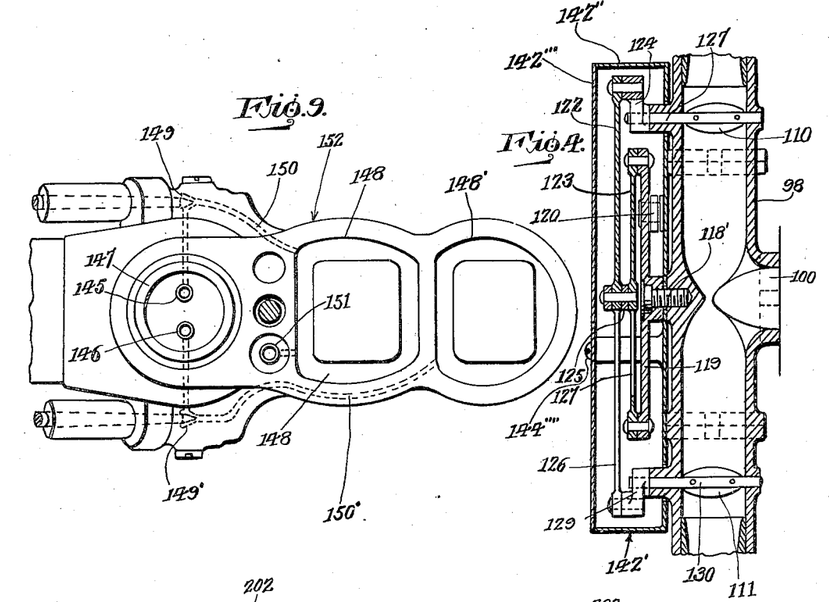
Figure 4 is a section on line 4—4 Figure 2.
Figure 9 is a fragmentary view in sectional plan of another modified form of fuel mixing means.

The fuel controlling means includes a pivot member 235 of circular form which is integral with one side of element 225 substantially centrally of the latter. The member 235 extends through an opening formed in a plate 236, the latter being flanged around outside edge 237. The plate and flange provide the body of a casing for receiving such controlling means. The casing is to include a cover, not shown, in Figure 1 and such cover is secured against flange 237. With reference to Figure 4, the casing body and cover are shown. The plate 236 is formed with openings for the passage of shafts 228, 229, these latter when extended through plate 236 align with the pivot member 235. Mounted to revolve about the latter is an upstanding control plate 238 including a circular body part 239 having a pair of oppositely disposed arms 240, 241 which extend in parallel spaced inclined planes. The inclination of the arms is towards the axis of member 235. The arm 240 is at one end of the top and the arm 241 at one end of the bottom of body part 239.

Opposing body part 239, is what is termed a mixing link 242, having pivoted to its outer end, as at 243 the lower ends of a pair of upstanding upper parallel shifting links 244, 245. The inner link 245 of the pair is pivotally connected to the upper end of arm 240. The outer link 244 has its upper end pivotally connected, as at 246 to a crank arm 247 which is fixed to shaft 228. Opposing body part 239 are a pair of depending lower parallel shifting links 248, 249 having their upper ends pivotally connected, as at 250 to the inner end of the mixing link 242, and with the inner end of the latter normally opposing the member 235. The lower end of link 249 is pivotally attached to the lower end of arm 241. The lower end of link 248 is pivotally connected, as at 251 to a crank arm 252 which is fixed to shaft 229. The manner in which the links are connected up will be similar to that shown in Figure 4.

The body part 239 carries a stud 252 to which is pivotally attached a curved shifting bar 253 for control plate 238. The bar 253 is actuated from the accelerator of the engine and extends through a cut-out 254 in flange 237. Pivotally connected at its inner end to the stud 252 is a telescopic spring controlled fuel control rod 255 having its outer end pivotally attached to one arm 256 of a lever 257 formed of three arms, one indicated at 256, another at 258 and the other at 259. A lever 260 formed of a pair of parallel spaced links 261 opposes the plate 236. The lower end of lever 260 overlaps the body part 262 of lever 257. A stop 261' is associated with lever 260. The arms 256, 258 and 259 of lever 257 extend from body part 262. Arm 256 is of less length than arm 258 and the latter is of less length than arm 259. Arm 256 extends between the links forming lever 260. The body part 262 of lever 257 is pivotally connected, as at 263 to the lower end of lever 260. Opposing plate 236, adjacent the lever 260 is a thermostatic element 264 having means, as at 265 for connection with a temperature changing means, not shown. The element 264 includes a plunger 266 which extends into and is pivotally connected, as at 267 to the lever 260 above the outer end of rod 255. The element 264 is suitably connected to plate 236 and extends through a cutout 268 formed in flange 237. Supported by a bracket 269 fixed to plate 236, as well as depending from the latter and extending through a cutout 270 in flange 237 is a dash pot 271 of any suitable type and which has its plunger 272 pivotally connected as at 273 to the lower ends of a pair of parallel, upstanding, spaced, oscillatory links 274 formed with parallel slots 275 extending lengthwise thereof. Slidably connected to the links 274, as at 276 is the lower end arm 258 of lever 257. A tension coiled spring 259' extends from a position on the arm 259 to the flange 268 as at 268'. The lower end of arm 259 is pivotally attached, as at 277 to the lower end of a shift link 278 of angled form having its upper end pivotally connected, as at 279 to mixing link 242 intermediate the ends of the latter. Plate 236 is formed with socketed posts 280 to receive holdfast means, not shown, to secure the cover for the casing in position. The control means as described will function substantially in the same manner as referred to in connection with the control means shown in Figures 3 and 4.

Figures 2, 3:
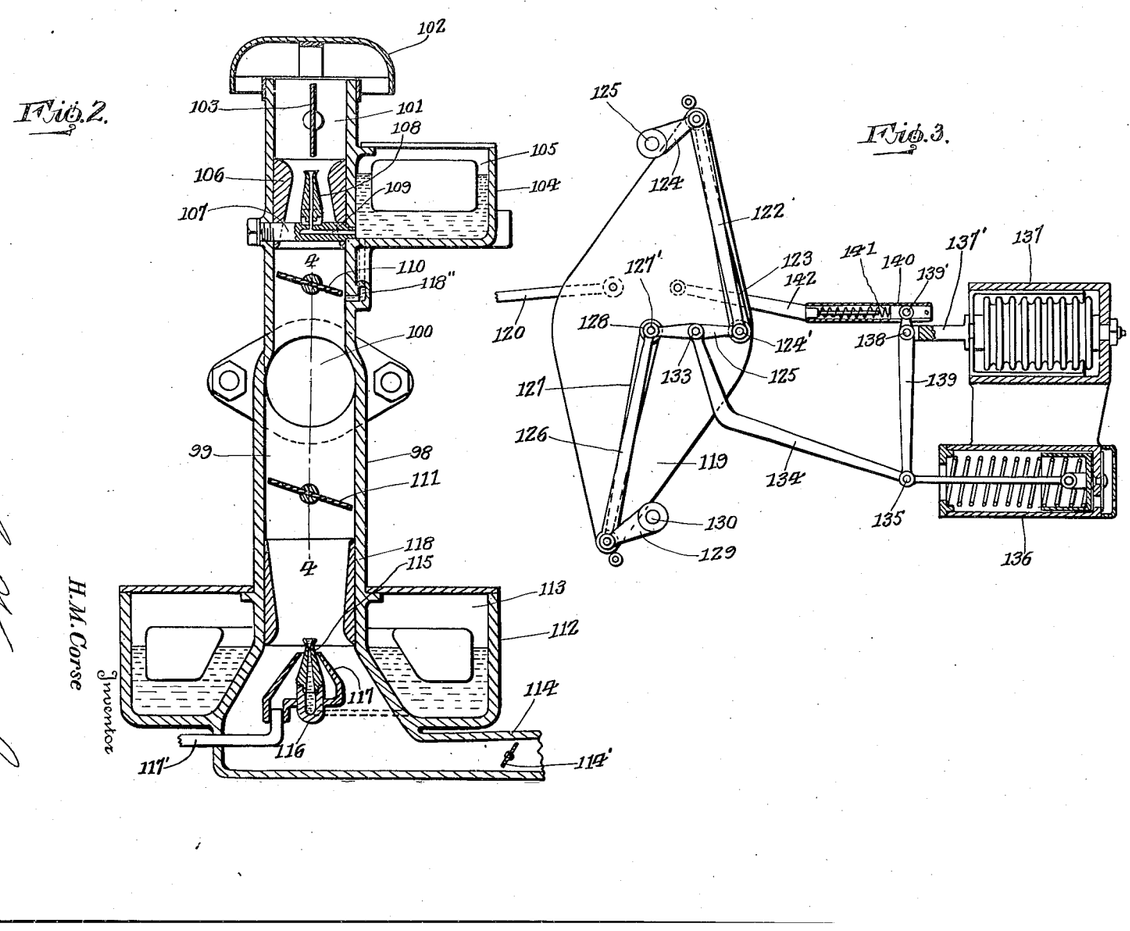
Figure 2 is a vertical sectional view of a modified arrangement of spaced fuel sources for control by a combined automatic and manually operable controlling means in accordance with my invention.
Figure 3 is an elevation of a modified form of fuel controlling means and which is employed in connection with the fuel sources shown in Figure 2.

Referring to Figures 2 and 4, a carbureter of the downdraft type is shown and it includes a tubular housing 98 which provides a mixing chamber 99 opening into the intake manifold 100. At one end of housing 98 an air intake 101 is arranged. Such end has connected therewith a spaced cap 102 to protect the intake and within such intake 101 is arranged a choke valve 103. Integral with the housing 98 is an extension 104 providing a float controlled gasoline chamber 105 suitably connected to a source of supply. Adjacent the intake 101 and within housing 98 is a gasoline Venturi tube 106. Extending diametrically of housing 98, as well as being secured thereto is a support 107 for a nozzle 108 which provides a gasoline jet. The support 107 is formed with a passage 109 which opens into chamber 105 and into the nozzle 108. Positioned at one end of chamber 99 is a gasoline controlling valve 110 and arranged at the other end of chamber 99 is a distillate controlling valve 111. The housing at that end opposite the end provided with the air intake is formed with an extension 112 to provide a float controlled distillate chamber 113 suitably connected to a source of supply. Extending from that end of housing 98 provided with the extension 112 is a tubular projection 114 adapted to communicate with a hot air supply and provided therein with a choke valve 114'.

Arranged within the housing 98 opposite the end which provides the air intake is a nozzle 115 which provides the distillate jet. Communicating with the chamber 113 is a distillate conductor 116 which supports and opens into the nozzle 115. Surrounding the latter as well as being spaced therefrom is a hot inert gas director 117 which communicates with a supply pipe 117'. Positioned within housing 98 and into which extends the nozzle 115 is a Venturi tube 118 for the distillate. The housing 98 intermediate its ends carries a pivot 118' for a purpose to be referred to. For supplying gasoline when idling, a passage 118" is provided and which leads from chamber 105 and opens into chamber 99 in proximity to valve 110.

With reference to Figures 3 and 4 there is illustrated a mechanism for controlling the operation of the valves 110 and 111. The mechanism consists of a master control plate 119 which is revolubly mounted on pivot 118' and to which is pivotally attached a control rod 120 for connection to an accelerator or throttle control lever. A pair of upper secondary links are indicated at 122, 123, the former is pivoted at its upper end to a crank 124 for shifting the stem 125 of valve 110. The link 123 has its upper end pivoted to the top of plate 119. The lower ends of links 122, 123 are pivoted to the outer end 124' of a mixing link 125. A pair of lower secondary parallel links are indicated at 126, 127 and which are pivotally connected at their upper ends, as at 127' to the inner end of link 125. The latter has its inner end arranged between the upper ends of links 126, 127. The pivot 127' normally opposes the pivot 118' for the plate 119. The lower end of link 126 is attached to a crank 129 for shifting the stem or shaft 130 of the valve 111. Pivotally attached as at 133 to the link 125 is an angle shaped shift link 134, which is pivoted as at 135 with the plunger of a dash pot 136. Arranged over the latter is a thermostatic device 137 having its plunger pivotally attached, as at 138 to a mixture control lever 139, the latter being connected to the pivot 135 and has an enlarged upper end 139' extended into a casing 140 carrying a compression spring 141, which opposes the upper end 139' of lever 139. A fuel control rod 142 is attached to plate 119 and extends into the casing 140 for the purpose of compressing spring 141. A casing 142' is employed to enclose the controlling mechanism and it includes a flanged body part 142" and a cover 142''', the latter will be detachably secured to the former, as at 144''''.

Figures 5, 6, 8:
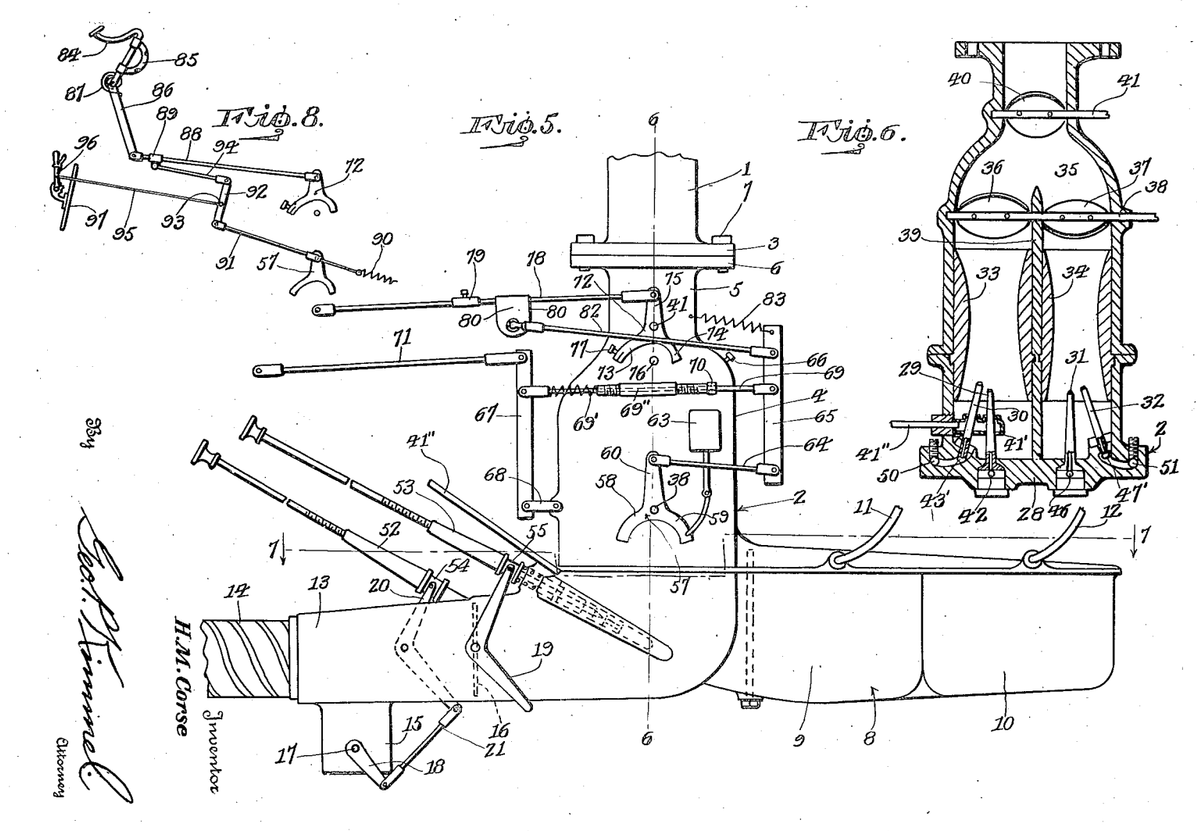
Figure 5 is a side elevation of another modified form of fuel controlling means of the combined automatic and manually operated type.
Figure 6 is a fragmentary view in vertical section on line 6—6 Figure 5.
Figure 8 is an elevation illustrating a modified form of manually operated fuel controlling means.

Referring to Figures 5, 6 and 7 of the drawings, 1 indicates the intake manifold of an internal combustion engine to which a carbureter 2 is secured. The manifold 1 is flanged as at 3. The carbureter 2 includes a housing 4 having a reduced upper portion or neck 5 formed with a flange 6 which abuts and is secured to flange 3 by the holdfast means 7.

Extended from one side of the housing 4 at the bottom thereof is a casting 8 providing a float controlled distillate container, chamber or reservoir 9 and a float controlled gasoline container, chamber or reservoir 10 having supply lines 11, 12 respectively leading thereto. Projecting laterally from the opposite side of the housing 4 at the bottom thereof is a tubular extension 13 which communicates with a flexible tubing 14 leading from a hot air supply, the latter not being shown and can be any conventional means arranged in connection with the discharge pipe of the engine. Opening into the extension 13 adjacent the tubing 14 is a cold air intake 15. Positioned within extension 13 is a choke valve 16. Arranged within the intake 15 is a cold air valve, not shown, having its stem or shaft indicated at 17, and such valve stem carries a crank arm 18 arranged exteriorly of intake 15. Positioned outwardly of one side of the extension 13 and attached to the stem of valve 16 is a bell crank lever 19 and pivotally supported on the opposite side of extension 13 and out of alignment with bell crank lever 19, is a bell crank lever 20 pivotally connected at its lower end to a connecting rod 21 which is pivotally attached to the crank arm 18. The lever 20 is positioned between crank arm 18 and lever 19.

Arranged at opposite sides of the lower portion of housing 4 are hollow inclined lateral enlargements 22, 23 formed with valve seats 24, 25 respectively which coact with needle valves 26, 27 respectively for a purpose to be presently referred to. Secured in the bottom of housing 4 are two spaced pair of spaced nozzles. The nozzles of one pair are indicated at 29, 30 and those of the other pair at 31, 32. The nozzle 29 is perpendicular and the nozzle 30 inclines towards the latter. The nozzle 31 is perpendicular and the nozzle 32 inclines towards the latter. The nozzles 29, 30 are provided for jetting distillate into a Venturi tube 33 and the nozzles 31, 32 are used for jetting gasoline into a Venturi tube 34. The tubes 33, 34 are seated in wells 34' arranged in the housing 4. The nozzles extend into the lower portions of the tubes. The tubes open into a mixing chamber 35, the former having the outlets controlled by a pair of valves 36, 37 angularly disposed with respect to each other, moving in unison and fixed to a common stem 38 pivotally mounted in the upper end of a web 39 and in the body of housing 4. The web 39 is arranged within housing 4, separates and extends above the tubes 33, 34. The stem 38 projects from one side of housing 4. The valves 36, 37 associate with the tubes 33, 34 respectively. The inner diameter of each of the tubes gradually decreases from each end to the transverse median of the tube. Arranged in the neck portion 5 of housing 4 is a throttle valve 40 carried by a stem 41 pivotally mounted in and extended from one side of the neck 5. The pair of nozzles 29, 30 extend through a heater 41'. A line 41'' for conducting inert gases from the exhaust of the engine to the heater 41' is employed. The function of heater 41' is not only to heat the nozzle, but also to supply inert gases to prevent knocking. The heater 41' is apertured to discharge the gases received thereby around the periphery of the nozzles.

The nozzle 29 is the main distillate jet and is directly connected to chamber 9 by a channel 42. The nozzle 30 is the low speed distillate jet and is fed from a reserve well 43 through a port 43'. The well 43 is supplied through a passage 44 which extends from a metering nozzle 45 in the wall of chamber 9. The nozzle 31 is the main gasoline jet and is directly connected to the chamber 10 by the channel 46. The nozzle 32 is the low speed gasoline jet and is fed from a reserve well 47 through a port 47'. The well 47 is supplied through a passage 48 which extends from a metering nozzle 49 in the wall of chamber 10. The nozzles 30, 32 are also fed by by-passages 50, 51 respectively leading from chambers 9, 10 respectively and controlled by the needle valves 26, 27 respectively.

The needle valves 26, 27 respectively are carried by controlling rods 52, 53 the former being common to the cold air controlling valve and the latter to the choke valve 16. The rod 52 carries a flanged collar 54 into which one arm of the bell crank lever 20 extends. The rod 53 carries a flanged collar 55 into which one arm of the bell crank lever 19 extends. To adjust valve 26, the rod 52 is turned and to close the cold air intake controlling valve, the rod 52 is pulled outwardly. To adjust valve 27 rod 53 is turned and to close the choke valve 16 the rod 53 is pulled outwardly. The stems of valves 26, 27 have threaded engagement with enlargements 22 and 23 respectively. The rods 52, 53 are slidably connected to the stems of valves 26, 27 respectively.

Attached to stem 38 of the mixture controlling valves 36, 37 is a lever 57 formed of three arms 58, 59 and 60. Attached to arm 59 is a dash pot 63 to delay action of the mixture control valves 36, 37 when throttle is suddenly opened. Attached to arm 60 is a connecting rod 64 which is attached to the lower end of an upstanding mixture control bar 65. Carried by the housing 4 is an idling gasoline jet air adjuster 66. The bar 65 is arranged adjacent one side of housing 4 and positioned adjacent the opposite side of the latter is an upstanding mixture control bar 67 having its upper and lower ends arranged below the upper and lower ends respectively of bar 65. The lower end of bar 67 is coupled with the housing 4, as at 68. The bars 65 and 67 are coupled together by a spring tensioned coupling member 69 which carries a compression spring 69' therefor. A tubular support 69'' is provided on housing 2 and threadedly engaging therewith, as well as extending therethrough is an adjustable tensioning sleeve 70, for spring 69'. The member 69 extends through sleeve 70. The member 69 is pivoted at its ends to bars 65, 67. Connected to the upper end of bar 67 is a manually operated push member 71.

Attached to the stem 41 of throttle valve 40 is a lever 72 formed of three arms 73, 74 and 75. A stop 76 is arranged between arms 73, 74 for limiting the throw of lever 72 in opposite directions. An adjustable stop screw 77 is carried by arm 73 which coacts with stop 76. Connected to arm 75 is a manually operated throttle control rod 78 provided with an adjustable stop 79. A sleeve 80 is slidably mounted on rod 78 and has connected thereto one end of a push rod 82 which has its other end pivotally attached to bar 65, the latter being coupled at its upper end with the housing 4 by a spring 83.

Referring to Figure 8, it illustrates a modified mechanism for adjusting the mixture controlling and throttle valves. In Figure 8, the levers 57 and 72 are shown. A foot accelerator is indicated at 84 which is carried by a bracket 85. Attached to the accelerator is a link 86 having associated therewith a spring 87 for closing the throttle. Attached to lever 72 and to link 86 is a throttle control rod 88. Mounted on the latter is a sleeve 89 adjusted to move with control rod 88 after throttle is partly opened. Attached to lever 57 is a spring 90 for the purpose of shifting mixture control valve for more gasoline. Also attached to lever 57 is a control rod 91 which is connected to a lever 92 having a sliding pivot 93. The lever 92 is attached by a coupling rod 94 to the sleeve 89. Attached to lever 92 is a pull member 95 connected to an adjustment lever 96 with a lever 100 and pawl device to engage with a rack. Lever 96 is arranged on the dash 97.

Figure 9 illustrates a modification wherein a single nozzle 145 is employed for jetting the gasoline and a single nozzle 146 is used for jetting the distillate. A single Venturi tube 147 is common to both nozzles. The gasoline and distillate sources are designated 148, 148' respectively. Operable needle valve elements 149, 149' are provided for controlling the supply to the nozzles 145, 146 respectively. A supply channel 150 leads from source 148 to nozzle 145. Element 149 controls supply through channel 150. A supply channel 150' leads from source 148' to nozzle 146. Element 149' controls supply through channel 150'. A well 151 communicates with source 148 for supply of gasoline when idling. Certain of the structural features referred to form part of a casting 152 and the others are supported by the latter.

Figure 10:
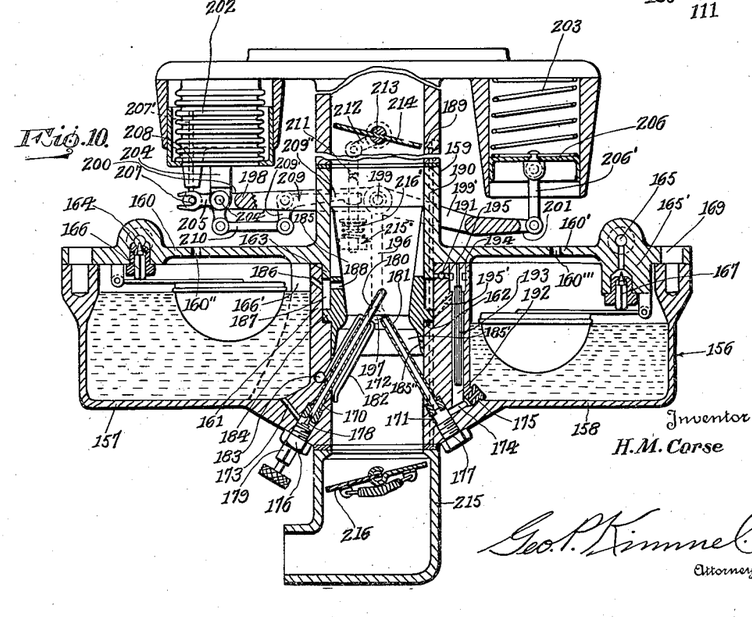
Figure 10 is a vertical view of still another modified form of fuel controlling means.

Referring to Figure 10, a tubular open top housing 156 is shown and formed with lateral extensions to provide a distillate containing chamber 157 and a gasoline containing chamber 158. A tubular element 159 formed with oppositely disposed, lateral, flat flanges 160, 160' provide covers for the chamber 157, 158 respectively. The element 159 is mounted on housing 156 and depends into the latter. The upper portion of the inner face of the body 161 of housing 156 is of increased diameter to provide a shoulder 162. The element 159 has an annular depending flange 163 which bears against the upper portion of the inner face of wall 161 and is spaced from shoulder 162. The flanges 160, 160' are formed with air vents 160'' and 160''' respectively and with supply ports or passages 164, 165 respectively for chambers 157, 158 respectively. The ports or passages communicate with a suitable source of supply. The ports 164, 165 are controlled by float operated controlling valves 166, 167 respectively. The flanges 160, 160' are detachably secured to the tops of chambers 157, 158 respectively by holdfast means 169. The body 161 of housing 156 at diametrically opposed points is formed with oppositely inclined passages 170, 171 which extend towards each other and communicate at their upper ends with a chamber 172 formed by body 161. The passages 170, 171 open at their lower ends at the bottom of the housing.

Extending from chamber 157 to passage 170 is a channel 173 for conducting distillate to the latter. Extending from chamber 158 to passage 171 is a channel 174 for conducting gasoline to the latter. The channels incline downwardly from said chambers and in the upper end of channel 174 is a ported metering plug 175 having the port thereof of less diameter than that of such channel. The lower ends of passages 170, 171 are closed by removable plugs 176, 177 respectively. Extending from the inner end of plug 176 is a needle valve 178 and adjusting means for the latter is indicated at 179 and is carried by plug 176. Positioned within passages 170, 171, extending therefrom into chamber 172 and extending towards each other are oppositely inclined nozzles 180, 181 respectively, the former providing a distillate jet and the latter a gasoline jet. The nozzles 180, 181 open into the passages 170, 171 respectively and have their lower ends spaced from the upper ends of plugs 176, 177 respectively and by this arrangement communication is established between the nozzles and channels 173, 174. The needle valve 176 is employed for controlling the flow of distillate to the nozzle 180.

The discharge end of nozzle 180 projects beyond the discharge end of nozzle 181. Surrounding a portion of that part of nozzle 180 which extends into chamber 172 is a superheater jacket 182 which communicates with an inert gas conducting passage 183 formed in body 161 of housing 156. The passage 183 communicates with the exhaust manifold of the engine.

Seated on shoulder 162, is a peripheral flange 184 of a vertically movable Venturi tube 185, the latter is formed with a skirt 185' which depends below shoulder 162 and is formed with a port 185''. The tube 185 extends upwardly into and bears against the inner face of element 159. The body 161 of housing 156 is ported as at 186. Port 186 opens into chamber 157 near the top thereof and also into an annular space 187 formed between tube 185 and body 161. The tube 185 is formed with an outlet 188 for space 187.

Opening into the element 159 above the tube 185 is an idling orifice 189 which communicates with a passage 190 formed in the body of element 159 and in the body 161 of housing 156. The passage 190 connects with the air inlet 191 provided in the body 161 and with a tube 193 opening into channel 174. Within a passage 192 is arranged the tube 193, the latter providing jet for gasoline discharging in a space 194 which opens as at 195 in the air inlet 191 whereby a carbureted mixture of gasoline and air will be conducted through passage 190 to orifice 189. The body 161 is also provided with an air passage 195' leading from the air space above the gasoline in chamber 158. Passage 195' is blanked when the tube 185 is in the position shown in Figure 9 for updraft operation. On downdraft operation, tube 185 is reversed. When the tube 185 is moved upwardly, the opening 185'' in the skirt thereof is adapted to register with the passage 195 for equalizing the pressure in the space above the gasoline to prevent discharge of the latter. The same action with respect to the distillate will be had when port 188 is closed.

The tube 185 is vertically movable and for such purpose a pair of lifting rods 196 are employed and arranged on the opposite side of element 159, the latter is slotted for the passage of pins 197 carried by the tube 185. The skirt of the latter will close the slots through which pass the pins 197 on the upward movement of the tube. To the pins are attached the lower ends of the rods 196. Surrounding the element 159 is a horizontally disposed lever member 198 for vertically moving the rods 196, the latter being pivotally connected, as at 199 to the former. The member 198 is formed with a central opening 199' and is bifurcated at its ends as at 200, 201.

Supported adjacent one side of the element 159 is a thermostat 202 and adjacent the opposite side is a dash pot 203. A plunger 204 is connected to the thermostat and is pivoted as at 204' to the end 200 of lever 198. Mounted on pivot 204' is a bell crank lever 205 arranged at one side of member 198. The lever 205 is formed with two arms. The plunger 206 of the dash pot 203 is connected by a link 206' to the end 201 of lever member 198. The link 206' has each of its ends pivoted. One arm of lever 205 seats on a pivot 207 carried by a hand operated rod 207' for shifting lever 205 for controlling the proportions of the mixture to the engine. The rod 207' extends through a hanger 208. Pivotally supported from and at one side of member 198 is a bell crank lever 209 which has a depending arm 209' connected to the depending arm of the bell crank lever 205 by a link 210. The other arm 209" of lever 209 has passing therethrough a spring controlled shifting rod 211 for the lever 209 and which is operated from a crank arm 212 attached to the stem or shaft 213 of the throttle valve 214 arranged in the upper portion of element 159.

Extended from the body 161 of housing 156 is a tubular member 215 for communication with a hot air source. Member 215 is provided with a spring controlled choke valve 216.

The carbureting device as shown in Figure 2 may be termed a two butterfly valve type and the valves of such structure have been designated 110, 111, the former controlling the gasoline and the latter the distillate. As to the operation of the control mechanism shown in Figures 3 and 4 for such valves, it will be stated that as illustrated the valves are in closed or idling position. When the control rod 120 is pushed slightly by the application of pressure on the accelerator or throttle control, the main control plate 119 is shifted upon the pivot 118' and as the secondary link 123 is pivoted to the upper end of the plate 119 and to the outer end of the mixing link 125, the outer end of such mixing link will be depressed. As the lower end of the secondary link 122 is also pivoted to the outer end of the mixing link 125 it is moved downwardly on the shift of plate 119, and as link 122 is pivoted at its upper end to the crank arm 124 on the stem or shaft of the valve 110 it causes the latter to open to allow the motor to draw in carbureted gasoline vapor. The inner end of the link 125 will at such time be over the center of the stud 118' and as there is no motion imparted to the links 126, 127 the valve 111 will remain in closed position.

When the rod 120 is moved further the plate 119 turns further and movement of the links 122, 123 will provide for the crank 124 to act upon the shaft of the valve 110 to open the latter further. The control rod 142 being connected at one end to the plate 119 is moved lengthwise by the revolving movement of such plate, acting upon the spring 141 and cause it to come in contact with the upper end of the mixing control lever 139 providing for the latter to revolve around the pivot 138, and cause the lower end of lever 139, which is pivoted as at 135 to the shift link 134 to provide, for the latter to transmit lengthwise motion to the link 125 whereby the inner end of link 125 is moved towards the stud 118' and thus decreasing the effective lever length causing motion to be imparted to the link 122 and crank arm 124 and increasing the effective lever length to cause motion of link 126 and crank 129. Thus further motion of the control plate 119 causes the control mechanism to close the gasoline butterfly valve and to open the distillate butterfly valve. When the inner end of the link 125 opposes the outer end of the stud 118' the gasoline butterfly valve has then been turned to its closed position and the entire fuel supply is drawn through the distillate butterfly valve 111. Further motion of the control plate 119 causes further opening of the distillate butterfly valve 111 and as the mixture control lever 139, at this time is at the limit of its travel in one direction, the spring 141 is compressed and the operation of the motor is on full distillate until the control plate is moved in closing direction, but before reaching the closed position the control mechanism causes the mixing link 125 to move back to its initial position. In this manner the motor is automatically going on all gasoline carbureted vapor for idling and slow speed or slight speed and gradually shift to an all distillate carbureted vapor as the speed and load of the motor increases.

The above described operation takes place on slow motion of the accelerator or throttle control, but on rapid motion the dash pot 136 which is pivoted at 135 prevents the sudden movement of the elements 139, 134 and 125 consequently the spring 141 is immediately compressed and the motion of elements 139, 134 and 125 takes place slowly, as the dash pot allows the spring 141 to expand. This manner of sudden acceleration of the motor is obtained on gasoline feed with a gradual shift to distillate feed.

Good combustion is consequently obtained at practically all times by use of this variable fuel mixture and the troubles are avoided of certain deposit and dilution of the crank case lubricating oil usually experienced in using heavier fuels such as kerosene or distillate in an engine designed primarily for gasoline fuel.

In a motor operating under moderate to good load for a large proportion of its running time, a great economy in fuel cost will be obtained by the use of the vehicle mixture controlling system as referred to, as a small proportion of the total fuel will be gasoline used for starting idling and low speed and a great proportion of the total fuel will be the heavier and cheaper fuel such as kerosene or distillate.

The thermostat is controlled by the temperature of the engine, and the action of the control mechanism is as above described under this condition, but when the engine is only warm the thermostat is contracted and the pivot 138, to which the plunger of the thermostat is attached, pulls lever 139 in a direction whereby the gap is widened between spring 141 and the upper end of lever 139. Thus making the shift over to distillate commences only after a greater motion of the accelerator and consequently after a greater opening of the gasoline butterfly valve. When the thermostat is fully contracted the control mechanism causes motion of the accelerator to be transmitted only to the gasoline butterfly valve and the motor operates entirely on gasoline until warmed up and working at sufficient load to cause the shift links to operate. Then the shift from gasoline to distillate is made gradually without any interference with the normal operation of the motor.

With reference to the form shown in Figure 10, it is shown what is termed a one butterfly type of a distillate-gasoline carbureter with the variable mixture control system incorporated therewith. The butterfly valve forming an element of the construction has been designated 214. The form shown in Figure 10 is so set up as to be interchangeable for downdraft or updraft operation. With reference to Figure 10 it will be noted that the element 159 is formed of two sections, the upper of which carries the thermostat 202 and dash pot 203 and the controlling valve 214. It will also be noted that the member 215 is not a part of housing 156, but is connected to the lower end of the latter. The upper section of element 159 can be interchanged with respect to member 215 and the latter can be positioned upon the upper end of the lower section of element 159. When the structures referred to are interchanged from the position shown in Figure 10, provision is made for an updraft operation. When the structures referred to are interchanged with respect to the position shown in Figure 10, the tube 185 is reversed. The operation of the interchangeable updraft or downdraft type is based on the same general principle of a variable mixture of two fuels with automatic control mechanism. With reference to Figure 10 it will be noted that the level of the heavier fuel is higher than the lighter fuel and the heavier fuel is jetted through the nozzle 180 having a higher discharge orifice when an updraft operation is carried on. When the direction of operation is changed to downdraft the nozzles are interchanged with each other so that the heavier fuel, such as distillate will be contained in the same chamber, but fed through the nozzle 181 and the long extended boss assembly mounting 165' is positioned in the chamber 157 so as to maintain a fuel level corresponding with the discharge orifice of the shorter nozzle. Super-heating inert gas is supplied through the channel 183 and this heat is transmitted to the radiating fins 166' to the heavier liquid fuel contained in the chamber 157. This passage 183 also connects to the superheating jacket 182. The super-heating inert gas passes through the jacket and is discharged through the orifices at the upper end of the jacket and becomes part of the carbureted fuel mixture into the motor. The super-heating inert gas performs four functions, such as warming the fuel in chamber 157, super-heating the fuel in the nozzle, supplying sufficient deadening element in the carbureted fuel mixture to prevent pre-ignition knocking in the engine and supplying moisture to prevent the deposit of hard carbon on the walls of the combustion chamber of the engine.

When the engine is starting or idling the throttle butterfly valve 214 is in a nearly closed position and pure gasoline carbureted fuel mixed with air is drawn through the idling orifice 189 from the passage 190 which connects with the air inlet 191 and through the latter the supply passage 174 and chamber 158. The passage 190 extends into both the cover piece and the housing and is independent of the passages or channels 174, 195' so that the idling or starting mixture is supplied to the orifice 189 in either downdraft or updraft operation. The member 215 blocks off the unused end of the passage 190 when the device is in the position shown in Figure 10.

When the valve 214 opens further the suction on the orifice 189 is greatly decreased and the supply of gasoline fuel mixture through the orifice 189 ceases. When the valve 214 opens beyond the idling position, the supply of carbureted fuel mixture is drawn through the Venturi tube 185, which is in its lower position, as shown in Figure 10, and causes a partial vacuum in the neck of the tube and at the orifice of the nozzle 181. The air pressure in the chamber 158 remaining constant, gasoline flows out through the orifice of the nozzle 181 and is metered by the smaller orifice in the plug 175.

As the plunger 204 of the thermostat 202 is extended the lever 205, link 210, lever 209, mounted on the member 198 assume a position so that the rounded end of lever 209, through which the rod 211 passes comes in contact with the adjustable resilient stop 215' on the end of rod 211, as the rod 211 has been raised by the crank arm 212 of the stem or shaft 213 of the valve 214 as the latter has been opened. The resilient stop 215' includes a compressible spring 216'.

As the valve 214 is opened the crank arm 212 moves and the rod 211 and adjustable stop 215' are raised. The stop 215' then comes in contact with the rounded end of arm of lever 209, as the opposite end of lever 209 is held in position by the linkage connecting to the thermostatic plunger. Further opening of the valve 214 causes the lever 198 to move around its pivot 204' and raise the links 196 to which it is pivoted and in turn raise the Venturi tube 185.

The port 186 connects the chamber 157 to a point inside the Venturi tube 185 opposite the orifice of nozzle 180, thus equalizing the air pressure above the distillate with the air pressure at the orifice of nozzle 180, so that fuel will not flow through the latter when the Venturi tube is in its lower position.

As the Venturi tube is raised by the links or rods 196 due to further opening of valve 214, the air port 186 is closed and an air passage 195' is opened and the air pressure above the gasoline in chamber 158 is equalized with the air pressure at the orifice of nozzle 181 causing the supply of liquid fuel to stop flowing through nozzle 181 and commence flowing through nozzle 180 because when the passage 186 is closed the air pressure above the heavier fuel in chamber 157 becomes atmospheric due to leakage through small orifice in cover plate and due to the reduced pressure in the neck of the venturi.

In the above described operation, it is shown that carbureter and control mechanism will automatically supply a gasoline carbureted mixture at starting idling and low speeds of motor at all times and at high speeds when the motor is cool. After the motor is hot, gasoline carbureted mixture will be supplied for starting, idling and low speeds, and as the throttle opening is increased the fuel supply will automatically be shifted to heavier and cheaper fuel such as kerosene or distillate. One end of the lever member 198 is pivoted to the link 206' which is pivoted at its upper end to the piston of the dash pot 203. The action of the dash pot is to prevent rapid motion of the lever member when the throttle 214 is suddenly opened, thus giving gasoline mixture for sudden accelerating and gradually shifting to distillate mixture as the compressed spring 216' of the stop 215' expands.

With reference to Figures 5 and 6, the operation to start engine when cold is first, open the throttle valve 40 slightly; second turn mixture cutout so that distillate valve 36 is closed and gasoline valve 35 is open; third turn gasoline needle valve 53 one-half to one turn open and pull, the collars 55 engage a pin in the upper end of the arm 19 attached to the stem of the choke valve 16 and moves the choke valve to the closed position shown; fourth turn on ignition switch, crank motor and release choke and fifth turn gasoline needle valve 53 to running position.

When engine is running under load and warmed up, to use distillate, release the mixture control lever 67. This will release the spring 69' so that the rod 68, sliding in the support 70, attached to bar 65 allows the spring 83 to move the rod 82 bringing the sliding sleeve 80 into a position near the shoulder 79 on the throttle control rod 78. As the throttle is partly opened, the shoulder 79 will come in contact with sliding sleeve 80. Further opening of the throttle will push the sleeve 80 and rod 82 causing the bar 65 to turn about the pivot in the end of rod 69 moving the rod 64 and the arm 60 rotating the stem 38 and moving the gasoline valve 37 in a closing direction and the distillate valve 36 in an opening direction. When mixture control lever 67 is released all the way, the mixture control valves 36 and 37 will be gradually turned to all distillate and no gasoline as the throttle is opened to running position and the reverse as the throttle is closed. The arm 59 is attached by a link to the dash pot 63. The function of the dash pot is to prevent rapid shifting of the valves 36 and 37 when the throttle 40 is suddenly opened. In this case the spring 69' is compressed and allowed to expand slowly as the dash pot releases gradually. When the leakage is adjusted to reach full distillate position before the throttle is wide open then the spring 69' is compressed in wide open throttle position.

I desire also to point out that in the operation of any internal combustion engine the fuel must be so mixed or supplied with air as to cause oxidation to proceed when once initiated by causing the proper temperature to obtain. This mixing or supplying with air may be done external to the cylinder or in the cylinder itself which then serves as a mixing chamber. When the term "mixing chamber" is used in the description and claims, it is meant to comprise both cases. In addition to the mixing of the fuels with air, or oxygen, when a plurality of fuels is used, it is usually desirable to mix the fuels with each other at some stage prior to the initiation of combustion, as well as to mix the combined fuels with air. The fuels may be mixed and then the mixture mixed with air, or each may be mixed separately with air and then the air mixtures combined, or one may be mixed with a surplus of air and this air mixture mixed with another fuel. When in the description and claims, the terms "mix", "mixing", or "mixture" are used they should be interpreted as the context may require in the light of this explanation.

When in the description and claims, the boiling point of a fuel is referred to, it should be borne in mind that hydrocarbon fuels ordinarily used in the operation of internal combustion engines are often mixtures of two or more substances, each with a definite boiling point at normal atmospheric pressure, and that properly speaking, the mixture has no boiling point. However, a certain fraction, or certain fractions usually predominate to the extent of classifying the fuel as low boiling or high boiling, these terms, and the term boiling point, wherever used herein, should be interpreted as the context may require in the light of this explanation.

When, in the description and claims, the term "manual" or "manually" is used, it should be interpreted to mean "by hand or any other portion of the body".

When in the description and claims, the term "throttle" is used it should be interpreted to mean, "any means of controlling the speed and power output of an engine".

What I claim is:—

1. In a fuel controlling system for internal combustion engines using a plurality of fuels, the combination of means for automatically varying the proportions in respect to each other of the fuels in substantially all proportions, and means for manually varying the proportions of the fuels.

2. In a fuel controlling system for internal combustion engines using more than one fuel, fuel sources, means for automatically varying the proportions in respect to each other of the fuels supplied from said sources in substantially all proportions in respect to each other, and means for manually varying the proportions of the fuels supplied from said sources.

3. In a fuel controlling system for internal combustion engines using more than one fuel throttling means, fuel reservoirs, each containing a fuel of a different boiling point, means for selectively supplying the fuels in varying proportions in respect to each other to the engine, means to allow the engine to idle on the fuel of lower boiling point and including a jet for such fuel having its orifice at the seat of said throttling means, and means for suspending the supply of the fuel of a higher boiling point when the engine is idling.

4. In a fuel controlling system for internal combustion engines using more than one fuel, fuel reservoirs, one containing a fuel of higher boiling point than that of the fuel contained in another, and means for retarding the supply of fuel of higher boiling point when the throttle of the engine is suddenly opened.

5. In a fuel controlling system for internal combustion engines using more than one fuel, reservoirs, one containing a fuel of a higher boiling point than that of another, means for selectively controlling the supply of said fuels to the engine, and adjustable means for partly opening the engine throttle while holding in suspense the supply of the fuel of a higher boiling point without upsetting the air ratio relative to such fuel.

6. In a fuel controlling system for internal combustion engines using more than one fuel, fuel reservoirs, one containing a fuel of higher boiling point than that of another, means for automatically varying the proportions in respect to each other of the fuels in substantially all proportions, means for manually varying the proportions of the fuels in respect to each other, and means for preheating the fuel of higher boiling point.

7. In a fuel controlling system for internal combustion engines using more than one fuel, fuel reservoirs, one containing a liquid fuel of higher boiling point than that fuel contained in another, means for supplying the fuels and for automatically varying the proportions of the supplied fuels in substantially all proportions and including a separate discharge nozzle for communication with each reservoir for jetting the fuel supplied from the latter, and means for utilizing exhaust gases from the engine for heating the liquid fuel of a higher boiling point in its reservoir, for heating the nozzle communicating with the latter and for mixing with the air supply into which the fuel is injected from the nozzle containing the fuel of higher boiling point.

8. In a fuel controlling system for internal combustion engines using more than one fuel, fuel reservoirs, one containing a liquid fuel of a higher boiling point than that contained in another, a discharge nozzle for communication with each reservoir for jetting the fuel supplied from the latter, and means for utilizing exhaust gases from the engine for heating the liquid fuel of higher boiling point in its reservoir, for heating the nozzle communicating with the latter and for mixing with the fuel discharged from such nozzle, said nozzles extending towards each other at an inclination and one being of greater length than and extended above the other.

9. In a fuel controlling system for internal combustion engines using more than one fuel, a structure providing a mixing chamber for communication with the combustion chamber of the engine and fuel reservoirs each provided with a float operated supply valve controlling mechanism, one of said reservoirs containing a fuel of higher boiling point than that fuel contained in another, nozzles communicating with said reservoirs for discharging the fuels into said chamber, means supported from the upper end of said structure for varying the proportions of the fuels in respect to each other discharged from the nozzles into said chamber and including a vertically movable Venturi tube within said chamber, and a valve controlled warm air supply member arranged at the other end of said structure.

10. In a fuel controlling system for internal combustion engines using more than one fuel, a structure providing a mixing chamber for communication with the combustion chamber of the engine and fuel reservoirs, each provided with a float operated supply valve controlling mechanism, one of said reservoirs containing a fuel of a higher boiling point than that contained in another, nozzles communicating with said reservoirs for discharging the fuels into said chamber, means supported from the upper end of said structure for varying the proportions of the fuels discharged from the nozzles into said chamber and including a vertically movable Venturi tube within said chamber, a valve controlled warm air supply member arranged at one end of said structure, said means and member when positioned at the upper and lower ends of said structure in connection with the Venturi tube when the latter is in normal position providing for updraft operation, said means and member being interchangeable with respect to said ends of said structure for updraft operation, said nozzles being interchangeable with respect to each other for downdraft operation, and said tube being reversible from normal to provide for downdraft operation.

11. In a fuel controlling system for internal combustion engines using more than one fuel, a structure providing a mixing chamber for communication with the intake manifold of the engine and fuel reservoirs, each provided with a float operated supply valve controlling mechanism, one of said reservoirs containing a fuel of a higher boiling point than that contained in another, nozzles communicating with said reservoirs for discharging the fuels into said chamber, means supported from the upper end of said structure for varying the proportions of the fuels in respect to each other discharged from the nozzles into said chamber and including a vertically movable Venturi tube within said chamber, a valve controlled warm air supply member arranged at the lower end of said structure, and means for conducting inert gases for heating a fuel of higher boiling point in its reservoir, for heating the nozzle communicating with the latter and for admixing with the fuel discharged from such nozzle.

12. In a fuel controlling system for internal combustion engines using more than one fuel, a structure providing a mixing chamber for communication with the intake manifold of the engine and fuel reservoirs, each provided with a float operated supply valve controlling mechanism, one of said reservoirs containing a fuel of a higher boiling point than that contained in another, nozzles communicating with said reservoirs for discharging the fuels into said chamber, means supported from the upper end of said structure for varying the proportions of the fuels discharged from the nozzles into said chamber and including a vertically movable Venturi tube within said chamber, a valve controlled warm air supply member arranged at the lower end of said structure, a heating jacket surrounding the nozzle which communicates with the reservoir containing the fuel of higher boiling point, means for supplying inert gases to said jacket to provide for the heating of such nozzle, and said jacket having outlets for discharge of the inert gases to admix with the fuel discharged from such nozzle.

13. In a fuel control system for internal combustion engines using more than one fuel, means for conducting fuel to the combustion space of the engine, throttling means coacting with said conducting means, means to provide fuel reservoirs, each for containing a fuel of a different characteristic, a fuel injecting means communicating with each reservoir and discharging into said conducting means, and a combined manually and automatically operable means for controlling the proportions of the fuels in respect to each other discharged into said conducting means.

14. In a fuel control system for internal combustion engines using more than one fuel, means to provide fuel reservoirs, each for containing a fuel of a different characteristic, a mixing chamber, a valve for controlling the supply of each of the fuels, said reservoir and the said valves positioned at opposite ends of said chamber, the latter for communicating with the combustion chamber of the engine, and a combined manually and automatically operated shifting means for said valves for controlling the proportions of the fuels in respect to each other supplied to said mixing chamber.

15. In a fuel control system for internal combustion engines using more than one fuel, means to provide a pair of fuel reservoirs, one for containing a fuel of a higher boiling point than that of the fuel contained in the other, a mixing chamber, a controlling valve for each of said fuels, said reservoirs and said valves positioned at opposite ends of said chamber, the latter for communicating with the combustion chamber of the engine, and an automatically operated shifting means for said valves for controlling the proportions of the fuels in respect to each other supplied to said mixing chamber.

16. In a fuel control system for internal combustion engines using more than one fuel, a structure including fuel sources, each containing a fuel of a different characteristic, a mixing chamber for communication with the combustion chamber of the engine, injector elements for supplying the fuels from said sources into said mixing chamber separately and in unison, and means for controlling the operation of said elements.

17. In a fuel control system for internal combustion engines using more than one fuel, a structure including fuel sources, each containing a fuel of a different characteristic, a mixing chamber for communication with the combustion chamber of the engine, injector elements for supplying the fuels from said sources into said mixing chamber separately and in unison, and a manually and thermostatically operable cushioned controlling means for said elements.

18. In a fuel control system for internal combustion engines using more than one fuel, a structure including fuel sources, each containing a fuel of a different characteristic, a mixing chamber for communication with the combustion chamber of the engine, injector elements for supplying the fuels from said sources into said mixing chamber separately and in unison, a throttle means, and a manually and thermostatically operable controlling means for said elements, said controlling means connected to said throttle means.

19. In a fuel control system for internal combustion engines using more than one fuel, a structure including fuel sources, each containing a fuel of a different characteristic, a mixing chamber for communication with the combustion chamber of the engine, injector elements for supplying the fuels from said sources into said mixing chamber separately and in unison, a throttle means, and a manually and thermostatically operable controlling means for said elements, said controlling means connected to said throttle means and including a thermostat, a dash pot, a revoluble control plate carrying a link and lever mechanism connected to the thermostat and dash pot.

20. In a fuel controlling system for internal combustion engines using more than one fuel, fuel reservoirs, each containing a fuel of a different characteristic in respect to each other, means for supplying the fuels in varying proportions to the engine in respect to each other, and means for retarding the changing of the proportions of the fuels in respect to each other when the throttle of the engine is suddenly or rapidly opened.

21. In a fuel controlling system for internal combustion engines using more than one fuel, fuel reservoirs, one containing a liquid fuel of a higher boiling point than that contained in the other, a separate discharge nozzle for communication with each reservoir for jetting the fuel supplied from the latter, and means communicating with the exhaust manifold of the engine for conducting exhaust gases to heat the liquid fuel of a higher boiling point, that nozzle jetting the liquid fuel of higher boiling point and for mixing such gases with the air supply into which the fuel of higher boiling is injected.

22. In a fuel controlling system for internal combustion engines using more than one fuel, an upstanding structure providing a mixing chamber for communication with the combustion chamber of the engine and a fuel supply, means for discharging fuel into said mixing chamber, means supported from said structure for varying the proportions of the fuel supplied to the mixing chamber and including a bodily movable Venturi tube operating in said chamber, a valve controlled warm air supply means for said chamber, said fuel proportioning means and warm air supply means when positioned at the upper end of said structure in connection with the Venturi tube when the latter is in normal position providing for updraft operation, said fuel proportioning means and warm supply means being interchangeable with respect to the ends of said structure for updraft operation, and said tube being reversible from normal for downdraft operation.

23. In a fuel controlling system for internal combustion engines using a plurality of fuels, a structure providing the combination of means for automatically varying the proportions in respect to each other of the fuels in substantially all proportions and means for manually controlling the proportions of the fuels, a mixing chamber for communicating with the engine, a throttle member, a valve controlled air supply member, and said members being interchangeable in position secured to said mixing chamber.

24. In a fuel controlling system for internal combustion engines using more than one fuel, a structure providing a mixing chamber communicating with the combustion chamber of the engine, means for supplying fuels of different characteristics separately and in combination in various proportions in respect to each other, an air supply member, means communicating with the exhaust manifold of the engine for conducting exhaust gases therefrom to heat one or more of the fuels and for mixing such gases with the air and fuel supply, a throttle member, and said members being interchangeable in position secured to said mixing chamber.

25. In a fuel controlling system for internal combustion engines using more than one fuel, a structure providing fuel sources, each containing a fuel of different characteristics, a mixing chamber for communicating with the engine, injector elements for supplying the fuels from said sources into said mixing chamber separately and in combination in various proportions, means for controlling the operation of said elements, a throttle member, a valve controlled air supply member for said chamber, and said members being interchangeable in position secured to said mixing chamber.

26. In a fuel controlling system for internal combustion engines using more than one fuel, a structure providing a mixing chamber for communication with the intake manifold of the engine and fuel reservoirs, one of said reservoirs containing a fuel of higher boiling point than the other, means communicating with said reservoirs for injecting the fuels into said chamber, and means for varying the proportions in respect to each other of the fuels injected into said chamber in substantially all proportions and including a movable Venturi tube.

27. In a fuel controlling system for internal combustion engines using more than one fuel, a structure providing a mixing chamber for communication with the intake manifold of the engine and fuel reservoirs, one of said reservoirs containing a fuel of higher boiling point than the other, means communicating with said reservoirs for injecting the fuels into said chamber, means for varying the proportions in respect to each other of the fuels injected into said chamber in substantially all proportions and including a movable Venturi tube, and means for conducting exhaust gases from the engine for heating the fuel of higher boiling point and for discharging such gases into the air supply into which the fuel of higher boiling point is injected.

28. In a fuel controlling system for internal combustion engines using fuels of different boiling points, a separate supply for each fuel, an automatically operable mechanism for varying the proportions in respect to each other of the fuels supplied in substantially all proportions and including a movable Venturi tube, and means for manually operating said mechanism for varying the proportions in respect to each other of the fuels supplied.

HERBERT M. CORSE.